Dec. 31, 1929.　　　　E. BOCCHINO　　　　1,741,400
ROASTING PAN SPIT DEVICE
Filed March 13, 1929
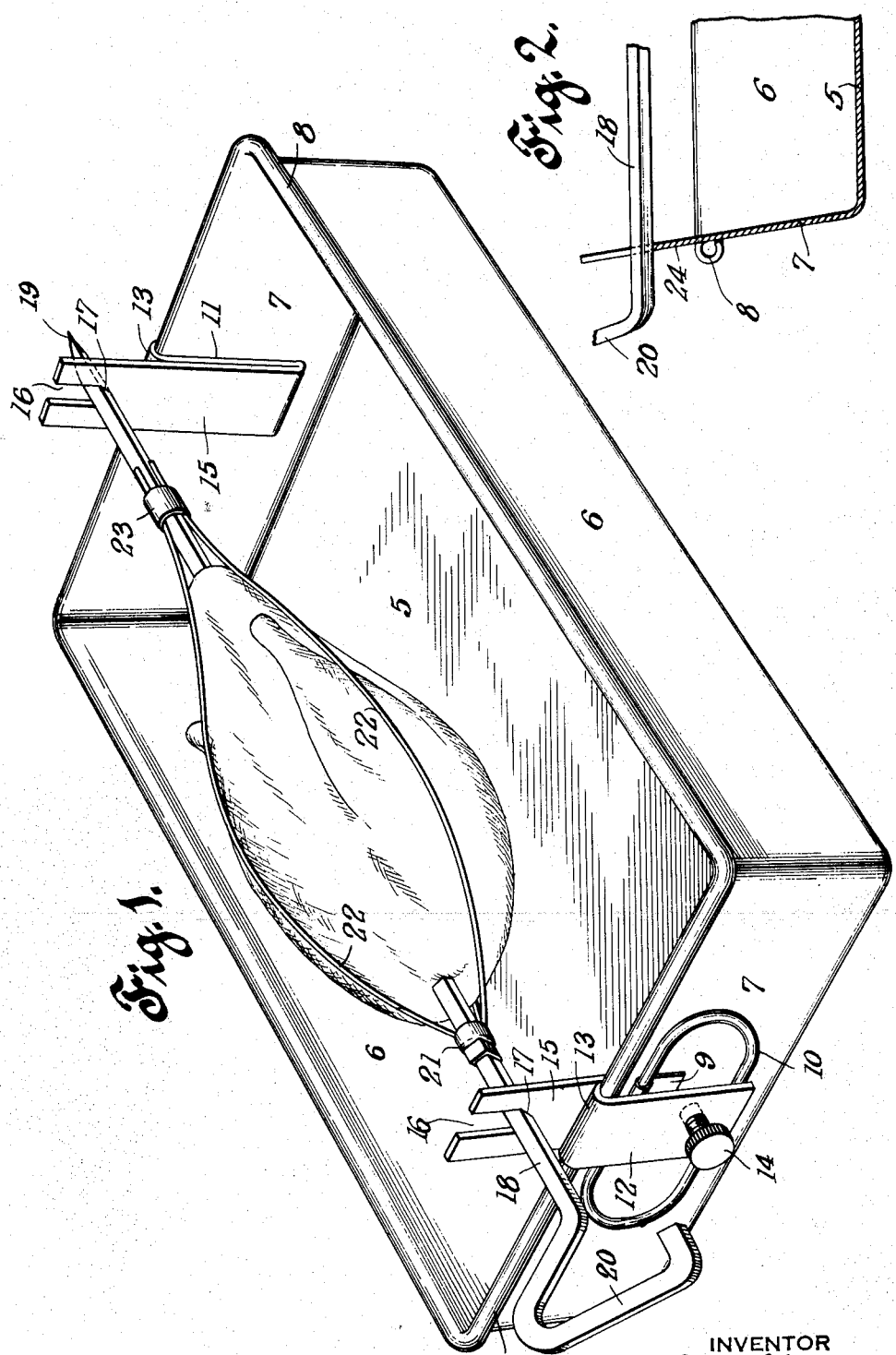

Patented Dec. 31, 1929

1,741,400

UNITED STATES PATENT OFFICE

ERNEST BOCCHINO, OF NEWARK, NEW JERSEY

ROASTING-PAN-SPIT DEVICE

Application filed March 13, 1929. Serial No. 346,543.

This invention relates to improvements in culinary utensils, with particular reference to pans for containing meats, poultry and the like while being roasted in an ordinary oven.

In roasting such foods it is common to place the article in a shallow pan to rest upon its bottom in the drippings and gravy exuding from the meat.

While such juices are desirable, and used in basting the meat, they have the effect of softening that portion disposed therein, preventing a uniform roasting effect and requiring frequent attention, including turning the meat from one side to the other, an accomplishment often difficult to perform, due to the exertion necessary and discomfort from heat of the oven.

It is therefore one of the objects of the present invention to provide a spit on which the meat is impaled and means on the spit to securely engage the meat to prevent its displacement.

A further feature is in the provision of supports at the ends of the pan whereby the object on the spit is adjustably held above the pan bottom.

Another purpose is to produce a spit, having supports at the opposite end of a roasting pan, provided with means for normally retaining the spit and its burden in any adjusted axial position.

These advantageous features are accomplished by the novel construction and combination of parts hereinafter described and shown in the accompanying drawings, forming a material part of this disclosure, and in which:—

Figure 1 is a perspective view of a conventional type of roasting pan, showing an application of the invention.

Figure 2 is a fragmentary sectional view showing a modification of the device.

The pan shown is of the usual type, well known to every cook and housewife, an oblong rectangle in plan, consisting of a bottom 5 having raised side and end walls 6 and 7 respectively, preferably of integral construction, and surmounted by a rigid circumjacent bead 8.

The side and end walls are ordinarily inclined slightly outward and rigidly secured to the end walls are clip brackets 9 by which are pivotally attached the upper members of looped handles 10 for convenience in carrying.

The invention consists in the provision of forked supports having inner and outer members, respectively 11 and 12, integrally connected at the bend 13, which is shown as seated on the bead 8.

The outer members 12 overlay the handles 10 and carry at their lower portions clamp screws 14, their point impinging on the ends of the pan to retain the supports in adjustment, vertically and laterally.

Integral with the inner members 11 are straight flat uprights 15 extending considerably above the upper edge of the pan, these uprights containing central open recesses 16 terminating in angular seats 17 at their bottoms.

The spit 18 consists of a rod of rectangular cross section, suited to be disposed lengthwise over the pan, and rest in the seats 17 of the supports.

One end of the spit is sharply pointed, as at 19 and the other is provided with a handle 20 by which the spit may be conveniently operated.

Slidably engaged on the spit 18 is a collar 21 in which are rigidly secured a plurality of thin spring wire arms 22, directed towards the opposite end of the spit and adapted to confine an object, as a fowl, roast, ground meats, etc., the free ends of the arms being clamped in a sleeve 23 freely slidable on the opposite portion of the spit.

In the modified form of spit support, shown in Fig. 2, parts of the end walls 7 are raised, forming ears as at 24, provided with recesses and seats to receive the spit in the manner described.

It will be understood that any number of the arms 22 may be employed so as to form in effect a net to contain the article to be cooked, thus enabling the device to be used on a wide range of food articles without danger of dismemberment, as well as upon solid objects.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described the invention, what is claimed as new and desired to secure by Letters Patent, is:—

1. In combination with a roasting pan, of support brackets having forked elements to straddle the end walls of the pan and an upright element to extend above the upper edge thereof at the inner side, said upright elements being notched at their tops, means to clamp said brackets at different heights adjustably to the pan. a spit rod of rectangular cross section to rest in the mentioned notches, said spit having a sharp point at one end and a handle at the other, and means adjustable on said spit adapted to enclose an object impaled thereon.

2. In combination with a roasting pan, supports to straddle the raised ends of the pan, an inner upright member integral with each support to extend thereabove, said members having angularly bottomed central recesses in their upper ends, means to adjust said brackets vertically relative to the pan, a spit engageable in the recesses to extend therebetween over the pan, a collar slidable on said spit, a plurality of spring arms fixed in said collar to confine an object impaled on the spit, and means slidable on the spit to clamp the free ends of said arms.

3. A roasting pan having upright supports at its ends, a spit engageable with said supports, a collar slidable on the spit, a plurality of resilient arms fixed in said collar to extend in spaced apart essentially parallel relation, and a sleeve slidable on said spit to removably engage the free ends of said arm.

4. A roasting pan having notched upright supports at its ends, a spit removably engageable with the notches in said supports, said spit being of angular cross section, a collar slidable on said spit, a plurality of spring wires fixed in one side of said collar to extend in spaced relation circumjacent the spit, and a sleeve slidable on said spit to engage the free ends of said wires.

In testimony whereof I affix my signature.

ERNEST BOCCHINO.